United States Patent [19]

Derenbecher, Jr.

[11] 4,052,733
[45] Oct. 4, 1977

[54] PAL FOUR-FRAME SUBCARRIER PHASE DETECTOR

[75] Inventor: William Joseph Derenbecher, Jr., Cherry Hill, N.J.

[73] Assignee: RCA Corporation, New York, N.Y.

[21] Appl. No.: 682,029

[22] Filed: Apr. 30, 1976

[30] Foreign Application Priority Data

May 20, 1975 United Kingdom ............... 21547/75

[51] Int. Cl.[2] .................. H04N 9/62; H04N 9/46; H04N 5/785
[52] U.S. Cl. ........................................ 358/10; 358/4; 358/19
[58] Field of Search .................. 358/4, 17, 19, 22, 18

[56] References Cited

U.S. PATENT DOCUMENTS 3,627,910  12/1971  Janssen et al. .......................... 358/19
Re. 28,823  5/1976  Coleman ................................. 358/18

Primary Examiner—John C. Martin
Attorney, Agent, or Firm—Eugene M. Whitacre; Paul J. Rasmussen; Mason DeCamillis

[57] ABSTRACT

Apparatus for digitally processing a composite video signal recorded in PAL format for producing a continuous waveform at a four-line rate indicates at any four-frame reference time if the polarity of the subcarrier is in phase with a reference or inverted for matching the subcarrier phase of two PAL signals as required in electronic splicing of video tape recordings, in special effects switching, or mixing of PAL video signals.

5 Claims, 4 Drawing Figures

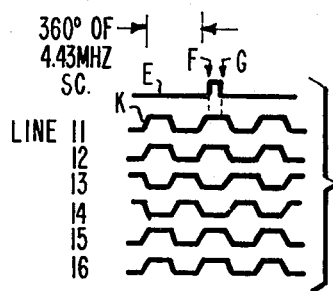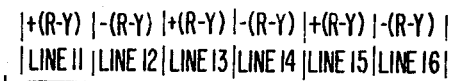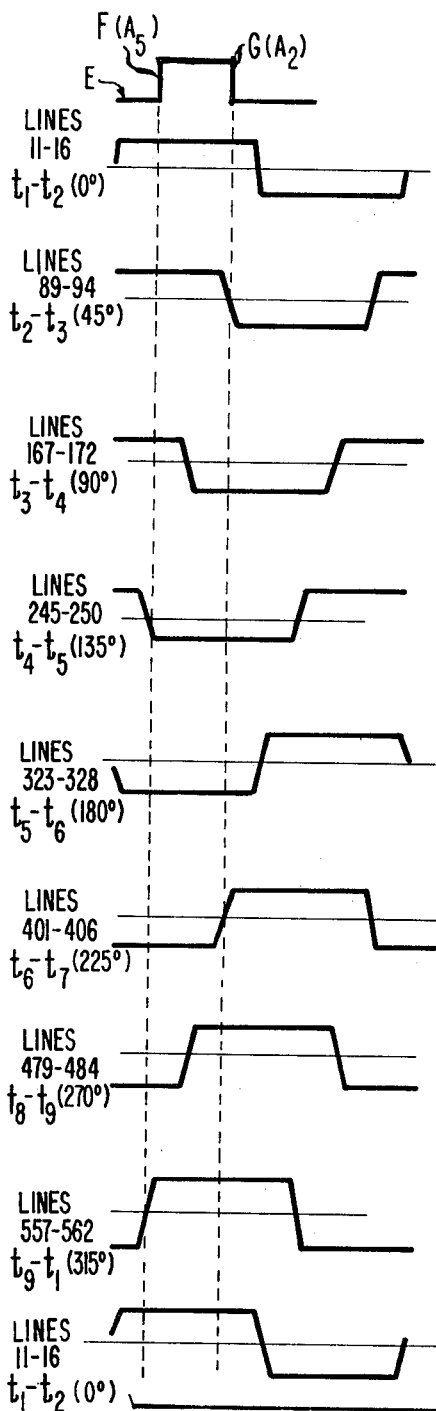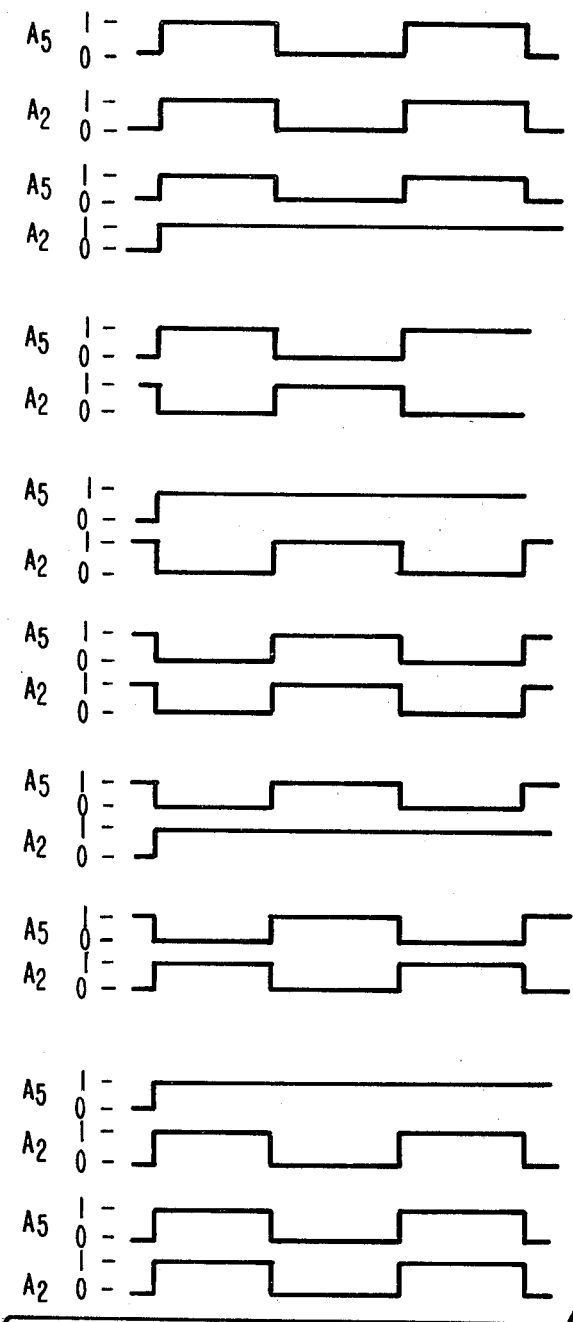
Fig. 2A
Fig. 2B

PAL FOUR-FRAME SUBCARRIER PHASE DETECTOR

This invention relates to systems for recording and reproducing information and, in particular, to a system for editing video information recorded on a record medium such as magnetic tape.

When television tape recording was first standardized, signal edit pulses were recorded on a control track of a magnetic tape to identify where to cut the tape for splicing. These control track edit pulses, which are at a 30Hz rate for the U.S. television standards and a 25Hz rate for the European television standards, are adequate for monochrome television editing and system synchronization, because a complete monochrome television picture (frame) occurs every one-thirtieth of a second in the U.S. system and every one-twenty-fifth of a second in the European system.

The availability of these signal pulses on the recorded magnetic tape proved to be useful for additional control functions. It was soon shown that the capstan lock-up time of a video tape recorder (VTR) could be improved if the control track edit pulses were used to drive the capstan in its initial lock-up cycle.

The advent of color television which included changes in the signal format required to provide the color information, posed a new set of problems in synchronization not easily accommodated with the originally specified frame edit rates of 30Hz and 25Hz.

In the NTSC system, the color signal information is carried in the phasing of a burst signal timed to occur after every horizontal sync pulse. This burst signal is related to horizontal sync by an integral number of cycles plus one-half cycle in each line and can be illustrated, for a 525 line system as follows:

| Frame | Line | Subcarrier Phase Change |
|---|---|---|
|   | 1 | 0° → 180° |
| 1 | 2 | 180° → 0° |
| 1 | 3 | 0° → 180° |
|   | ↓ |   |
| 1 | 524 | 180° → 0° |
| 1 | 525 | 0° → 180° |
| 2 | 1 | 180° → 0° |
| 2 | 2 | 0° → 180° |
|   | ↓ |   |
| 2 | 524 | 0° → 180° |
| 2 | 525 | 180° → 0° |
| 3 | 1 | 0° → 180° |

Thus, it can be seen that although two successive frames may be identical from a monochrome viewpoint, the color subcarrier contained in two successive frames is shifted by 180°, for example, Frame 1, Line 1, as compared with Frame 2, Line 1. In Frame 3, Line 1, however, the subcarrier has been again shifted by 180° with respect to Frame 2 and now coincides with Frame 1 in all respects. Similarly, Frame 2 will be coincident with Frame 4; therefore, two complete monochrome frames must be processed before it can be said that one complete color frame has been processed, effectively producing a color phase-repetitive frame rate of 15Hz. In tape recording utilizing the 30Hz rate editing pulses, it therefore becomes possible, for example, to splice Frame 1 to Frame 2, which, although perfectly acceptable for monochrome, causes on playback a 180° discontinuity in the color information which is carried in the burst signal phasing and results in an objectionable color "splash" in the reproduced picture. The addition of editing pulses to the control track of the tape recording to produce a 15Hz editing rate was therefore initiated, but, as expected, the edit pulse information used to also control capstan lock-up produced some changes in this latter function, for example, the change in lock-up time might be expected to be in the same ratio as the change in the edit pulse rate. However, it has been found that a decrease of the edit pulse rate to 15Hz increases lock-up time by about 20%, which is tolerable in the NTSC system.

In the PAL color system the problems assumed a much larger dimension. In PAL, the effective base color frame repetition rate in one-quarter the monochrome rate frame repetition rate. This may be illustrated as previously shown for an NTSC system as follows; for a 625 line system with a 25Hz frame rate and a subcarrier phase change equal to an integral number plus three-quarters of a cycle of burst:

| Frame | Line | Subcarrier Phase Change |
|---|---|---|
| 1 | 1 | 0 → 270° |
| 1 | 2 | 270° → 180° |
| 1 | 3 | 180° → 90° |
| 1 | 4 | 90° → 0° |
| 1 | 5 | 0° → 270° |
|   | ↓ |   |
| 1 | 9 | 0° → 270° |
|   | ↓ |   |
| 1 | 13 | 0° → 270° |
|   | ↓ |   |
| 1 | 625 | 0° → 270° |
| 2 | 1 | 270° → 180° |
|   | ↓ |   |
| 2 | 625 | 270° → 180° |
| 3 | 1 | 180° → 90° |
|   | ↓ |   |
| 3 | 625 | 180° → 90° |
| 4 | 1 | 90° → 0° |
|   | ↓ |   |
| 4 | 625 | 90° → 0° |
| 5 | 1 | 0° → 270° |

Consequently, the proper analogous frame editing rate for control rack edit pulses in the PAL system would not be 12 ½Hz, but rather 6 ¼Hz, since effectively four complete frames, for example, Frames 1, 5, 9, etc., must be processed to achieve complete synchronization in the form of horizontal sync and color burst phasing. Since the monochrome rate in a PAL system is 25Hz and the basic color frame repetition rate is 6 ¼Hz, it would appear that a second halving of the corresponding 12 ½Hz edit pulse rate to 6 ¼Hz would provide a proper edit timing identification. However, since the edit pulses have also been established by commercial practice as the reference signals for initiating the lock-up of the capstan servo of the VTR, the lock-up time would be of an intolerable period in a PAL system. Therefore, the PAL standards were specified to have 12 ½Hz two-frame rate edit pulses in order to preserve the capstan lock-up function. The use of 12 ½Hz, two-frame rate, edit pulses results in the possibility of an 180° phase reversal of burst phasing in a PAL system when splicing takes place. This is because there is a 50% statistical probability that, for example, Frame 1 will be spliced with Frame 3 as compared with splicing Frame 1 to Frame 5.

In preparing television programming, the operator is faced with the choice of allowing an improper splice to be played back with a result color "splash" for the finite period of time required for the automatic time base corrector circuits of a VTR to re-establish subcarrier phasing or to remake the splice with the same statistical 50% probability until a perfect splice is made. This latter mode of operation is very time consuming. Prior art attempts at identifying the burst phasing on a frame-by-frame basis require linear phase comparing circuitry which is difficult to operate as well as being costly to implement.

In accordance with the present invention, a PAL frame phasing system is provided for developing a phasing signal synchronized to a system frame reference signal and a PAL composite video signal including at least color burst and horizontal synchronizing components. The phasing system comprises a color burst detector for developing a color burst switching signal at a two-line period representative of the polarity of burst phasing with respect to the horizontal component and for developing a four-line rate signal. A four-line rate detector is coupled to the burst detector and responsive to the color burst switching signal and to the four-line rate signal for developing a four-line rate signal representative of the burst phasing repetition rate. First means are coupled to the color burst detector and the four-line rate detector and responsive to the color burst switching signal and to the four-line rate signal representative of the burst phasing repetition rate for developing a first signal at a four-line period switching rate phased to the four-line rate signal representative of the burst phasing repetition rate signal. Second means are responsive to the system frame reference signal for developing a second signal at a four-frame rate. Phase detecting means coupled to the first and the second means are responsive to the first and second signals for developing a third signal representative of the phasing status of the first signal with respect to the second signal.

BRIEF DESCRIPTION OF THE DRAWINGS

FIG. 2A — 2B and 3 illustrate waveforms depicting the operation of the apparatus of FIG. 1 in conjunction with a PAL signal format of 625 lines.

DESCRIPTION OF THE INVENTION

Figure 1:
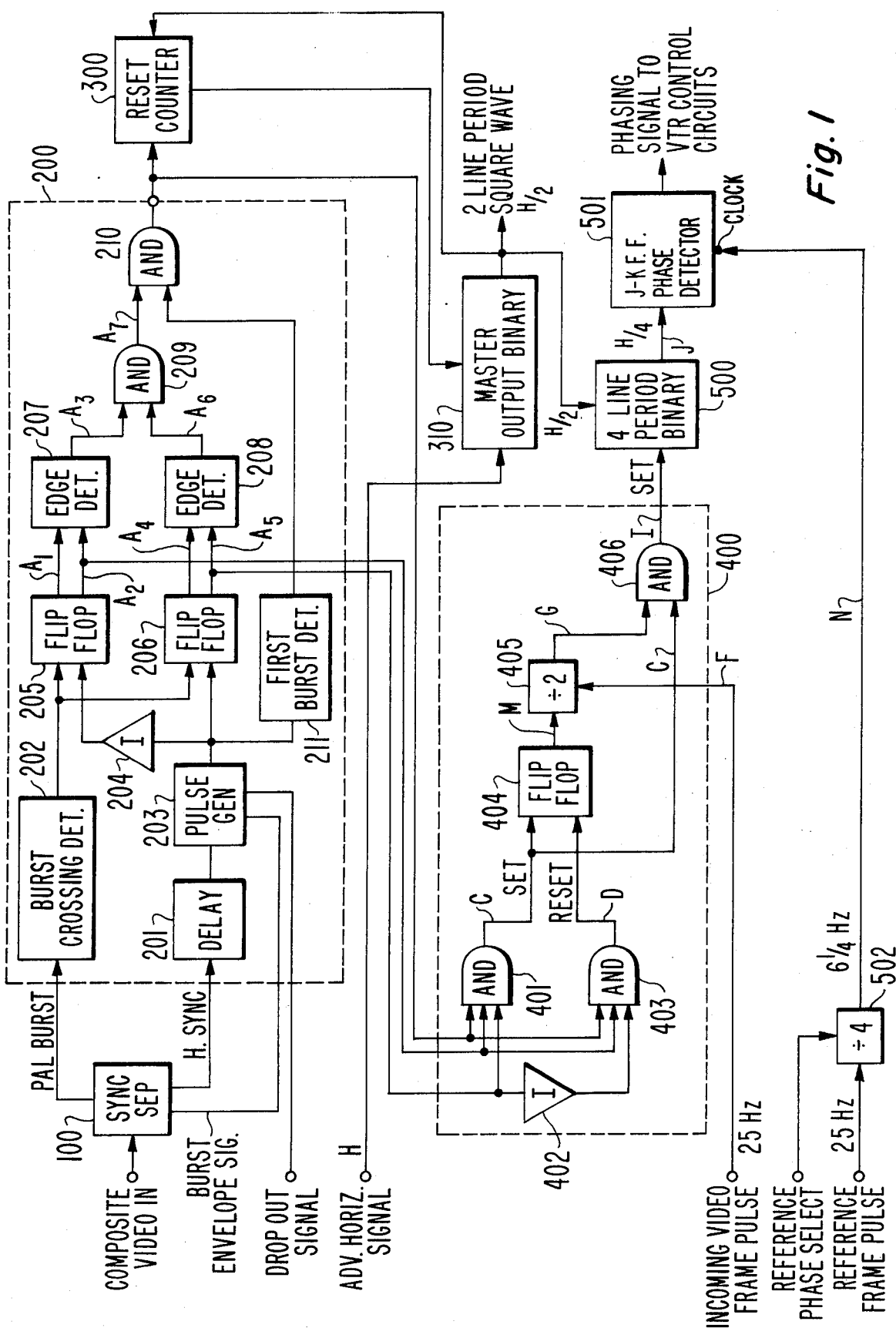
FIG. 1 is a block diagram of a PAL four-frame subcarrier phase detector according to the present invention.

In FIG. 1, a composite video signal is coupled to the input terminal of a sync separator 100, wherein the horizontal sync and burst components of the composite video source are separated in a known manner. Sync separator 100 also includes a burst envelope detector which may be in the form of a low-pass rectifier-filter so as to produce a burst envelope signal. The horizontal sync component is coupled to a delay circuit 201 which delays the leading edge of horizontal sync to occur within the burst interval, as illustrated, for example, in FIG. 2A which shows, for example, approximately three cycles of the burst signal K on each of television lines 11 - 16. The delayed horizontal sync is, in turn, coupled to a pulse generator 203 which produces a pulse from the leading edge of the sync waveform and which has a duration of approximately ¼ cycle (90°) of the subcarrier frequency and which is illustrated, for example, by waveform E of FIG. 2A. The output pulse signal of pulse generator 203 is coupled to the clock terminal of flip-flop 206 and to the clock terminal of flip-flop 205 by means of an inverter 204. Flip-flops 205 and 206, which are of the form known as J-K flip-flops are triggered by the leading and trailing edges G and F of waveform E, FIG. 2A, respectively, approximately ¼ cycle of subcarrier apart during the burst interval.

The burst component (waveform K of FIG. 2a) from sync separator 100 is coupled to the input terminal of a burst crossing detector 202 in which each cycle of the sinusoidal burst waveform is amplified and limited to produce a squared wave with relatively sharply defined zero crossings at the subcarrier repetition rate. The output square wave of burst crossing detector 202 is coupled to the data input terminals of flip-flops 205 and 206.

Since flip-flops 205 and 206 are arranged to change state only upon application of a signal level change at the clock input terminal, the output of flip-flops 205 and 206 will be square waves of two lines duration; i.e., lines 11 and 12 high and lines 13 and 14 low, as illustrated by waveforms $A_1$, $A_2$ and $A_4$, $A_5$ of FIG. 2A. The transition edges of the square wave output signal from flip-flops 205 and 206, representing the two-line component of the burst signal, are coupled to an input terminal of edge detectors 207 and 208, respectively. Edge detectors 207 and 208, which may be in the form of a differentiating network coupled to a Schmidt trigger, detect the signal transition of flip-flops 205 and 206 output signals without regard to polarity and provide at their output terminals respective signals identified as following edges and advanced edges which correspond to transitions G and F of waveforms E in FIG. 2A. The output signals from edge detectors 207 and 208 represent the beginning of each television line of positive R-Y phase (waveforms $A_3$ and $A_6$ of FIG. 2A). The output signal of edge detectors 207 and 208 are coupled to input terminals of AND gate 209, which, in turn, produces an output waveform illustrated by waveform $A_7$ of FIG. 2A. The output of AND gate 209 is coupled to one input terminal of a false edge eliminator circuit 210, which may be in the form of an AND gate, and, in turn, to the input terminal of reset counter 300. A first burst detector 211, which may be in the form of a retriggerable monostable multivibrator in conjunction with a differentiator circuit, is coupled to another input terminal of the false edge eliminator AND gate 210. First burst detector 211 has its input terminal coupled to the output terminal of pulse generator 203, thus the first burst detector 211 is triggered by pulse generator 203 on each line in response to the burst signal on each line from sync separator 100. If the burst is missing, first burst detector 211 is not retriggered, and its output inhibits the false edge eliminator AND gate 210 so as to eliminate the next burst edge from edge detectors 207 and 208, thereby preventing an output signal from detector 200 which may not be properly line-designated, which may happen, for example, in the event of a video tape signal dropout.

In a typical broadcast studio operation where, for example, a composite video signal from a tape recording is to be synchronized with an existing video signal, an advanced horizontal reference signal H obtained from a suitable generator, not shown, is coupled to an output binary divider 310 which develops at its output a signal H/2. This is the two-line period square wave commonly referred to as the PAL Square Wave. In operation, the polarity of this PAL square wave output H/2 rate must agree with the two-line period phasing of the R-Y component of the chroma recorded on the video tape recording if proper synchronization is to occur. The output of the detector 200, which represents the instantaneous line-by-line polarity; i.e., a positive R-Y component, is compared with the polarity of the H/2 output of the master binary divider 310 in reset counter 300. If the polarities differ, reset counter 300 provides a set pulse which is used to correct the polarity of the PAL square wave from the master output binary divider 310 whenever the master binary divider 310 output does not agree with the polarity of the R-Y component of the chroma of the recorded video signal.

The apparatus 100, 200, 300, 310 of FIG. 1, insofar as described, which insures that the PAL square wave (H/2) of a reference video source is in phase with the instantaneous line-by-line polarity of the R-Y component, is described in detail in my copending United States patent application, Ser. No. 671561, entitled, "PAL ALTERNATE LINE COLOR PHASE DETECTOR", which is incorporated herein by reference.

In accordance with the PAL standards for a 625 line system, the frame rate is 25Hz with 625 horizontal lines constituting a frame; therefore a signal, for example, horizontal sync, representing each horizontal line, will be coincident with a signal representing the frame (frame pulse) one every 625 lines for a 25Hz coincidence rate. In a similar relationship, an H/2 signal will be coincident with a frame pulse only once every other frame for a 12 ½ Hz coincidence rate, and an H/4 signal will be coincident with a frame pulse every fourth frame for a 6 ¼ Hz coincidence rate.

As previously described, the color phase repetition rate desired for a PAL color television system is 6 ¼ Hz or once every four frames to insure that the color subcarrier of the incoming video signal is correctly phased with respect to the reference video color subcarrier.

Continuing with the description of FIG. 1, the H/2 output signal from master output binary divider 310 is coupled to a binary divider 500 which provides at an output terminal a four-line period signal (H/4). The output of binary divider 500 is coupled to a phase detector circuit 501 in the form of a J-K flip-flop whose output status reflects the output status of binary 500. A reference frame pulse at a 25Hz rate is coupled to a divide-by-four circuit 502. The output signal from the divide-by-four circuit 502, which is at a 6 ¼Hz rate, is coupled to the clock input of the J-K flip-flop comprising phase detector circuit 501. The output signal from phase detector circuit 501 is a D.C. voltage level; i.e., a 0 or 1 level representing the in-phase or out-of-phase condition of the H/4 signal as sampled at the clock input of phase detector 501 at 6 ¼Hz intervals.

In order to insure that the H/4 signal from binary divider 500 represents the proper four-line period subcarrier (burst) phasing of the incoming PAL video signal for comparison with the reference video signal a four-line rate detector 400 is coupled to the SET terminal of binary divider 500. The operation of the four-line detector 400 in conjunction with a PAL video signal may be best understood by reference to the waveforms of FIG. 2B FIG. 3.

In a PAL video signal, which contains a frame rate offset in the subcarrier, the phase of the squared burst interval signal coupled to the data inputs of flip-flops 205 and 206 drifts with respect to the horizontal sync represented by the clock input (waveform E) to the flip-flop 205 and 206. This is illustrated in FIG. 2B, which shows a single cycle of burst for example, line 11 of the FIG. 2A, waveform K, being sampled by waveform E, as the subcarrier offset moves through 360° for the 625 lines constituting a frame. The leading and following edges of waveform E are shown sampling the burst phase while the burst signal is positive which results in the output signal illustrated in waveforms $A_2$ and $A_5$ for the period $t_1-t_2$ which includes horizontal lines 11-16, in the same manner as described in conjunction with FIG. 2A. As the subcarrier continues to drift, for example, period $t_2-t_3$, the leading edge of waveform E still samples during a positive burst phase while the following edge of waveform E, which is sampling at a burst crossover, is indeterminant, resulting in a status change in output signal waveforms as illustrated in corresponding waveforms $A_2$ and $A_5$ for period $t_2-t_3$. As the subcarrier continues to drift through the frame period $t_1$ to $t_9$, the output signal status of flip-flop 205 and 206 reflects the four-line period component of the burst signal. The output waveforms $A_2$ and $A_5$ of flip-flops 205 and 206 thus occur at an H/4 rate and contain the subcarrier 6 ¼Hz frame identification information to which the reference frame pulse must be phased.

Figure 3:
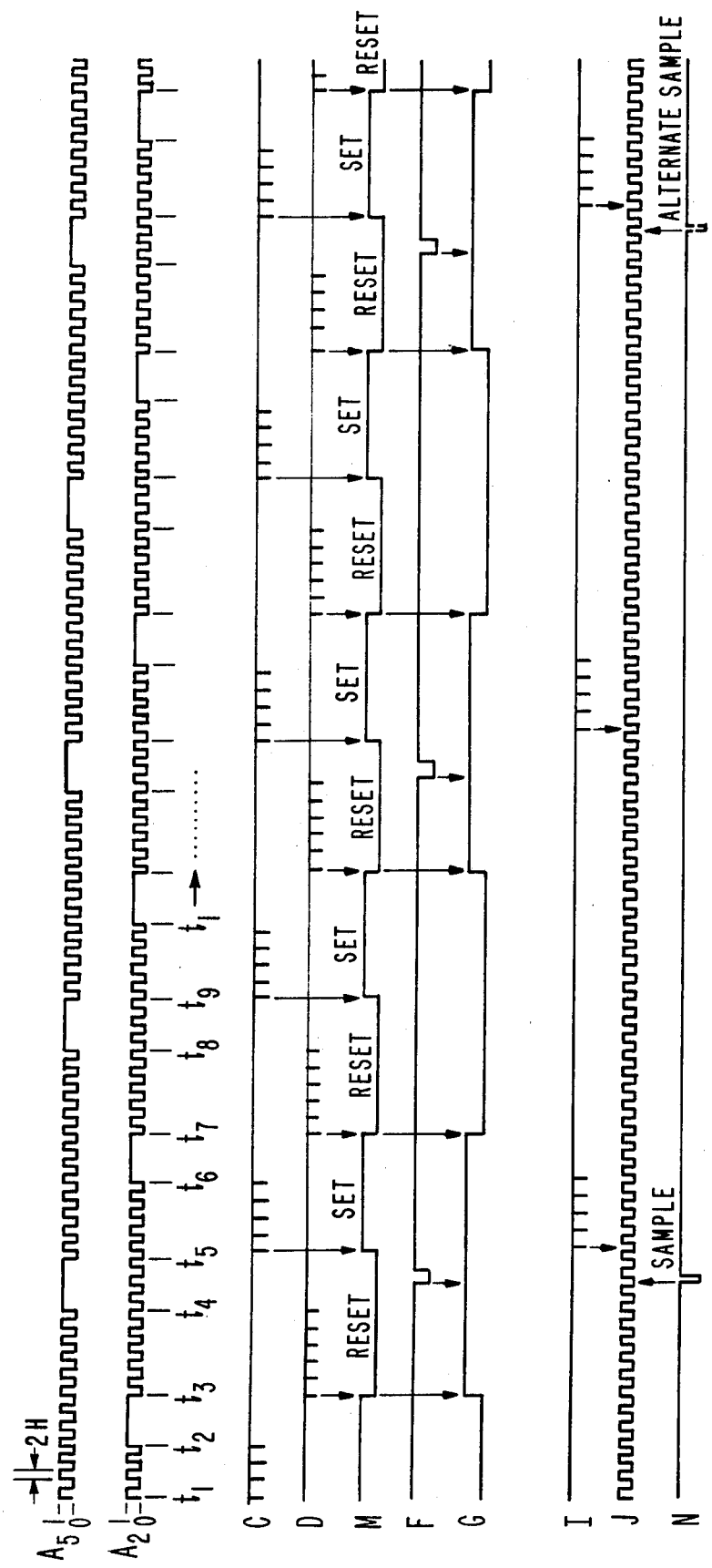

The output signals of flip-flops 205 and 206 (illustrated in abbreviated form by waveforms $A_5$ and $A_2$, respectively, of FIG. 3) and coupled to the input terminals of AND gates 401 and 403 in conjunction with the output of burst polarity detector 200. The lack of a signal from detector 200 at the inputs of ANG gates 401 and 403 inhibits gates 401 and 403 and insures that detector 400 will not produce a false SET pulse in the event of a signal dropout; i.e., the master H/2 binary divider as well as binary divider 500 continue to free run and will not be falsely set by a signal discontinuity caused by erratic operation of flip-flops 205 and 206 in the event of a signal dropout in the incoming video signal.

AND gates 401 and 403 each provide an output signal (waveforms C and D of FIG. 3) only when the sampled subcarrier phase (waveforms $A_5$ and $A_2$) are the same and the output of detector 200 indicates by the generation of the 2H edges that the output of flip-flops 205 and 206 are valid. Thus, the "ANDED" output of AND gate 401 (waveform C) contains pulses separated in multiples of four lines (H/4) having gaps twice every frame where the burst crossings are indeterminant. The group of pulses in multiples of four lines following each gap will be displaced from the preceding group of pulses by two lines. In order to eliminate every other group of pulses from the output of AND gate 401, thus achieving a four-line displacement which requires four frames to repeat, one of the flip-flop inputs (waveform $A_5$ of FIG. 3) coupled to AND gate 403 is inverted by inverter 402 and combined in flip-flop 404 in the following manner. The output signal of AND gate 403 (waveform D of FIG. 3) differs from the output signal of AND gate 401 (waveform C of FIG. 3) in that the pulses occur during the gaps in the output signal pulse train of AND gate 401. The output signals of AND gates 401 and 403 are coupled to a SET-RESET flip-flop 404 which is alternately set and reset to provide a square wave output at twice the frame rate (waveform M of FIG. 3). The output of flip-flop 404 is coupled to a binary divider 405 the phase of which is set by a frame rate pulse (waveform F), which is derived from the incoming video signal in known manner. The output terminal of binary divider 405 (waveform G of FIG. 3) is coupled to one input terminal of AND gate 406. The output terminal of AND gate 401 (waveform C) is coupled to the other input terminal of AND gate 406. The combined input signals to AND gate 406 allows AND gate 406 to provide an output waveform (waveform I of FIG. 3) for every other group of pulses from AND gate 401 which is phased with the frame pulse derived from the incoming video signal (waveform F). The output signal of AND gate 406, which is also the output signal of detector circuit 400, is coupled to the four-line period binary divider 500 to set the phase of divider 500. The output of binary divider 500 (waveform J of FIG. 3) is a continuous H/4 signal the phase of which is set in accordance with the four-frame subcarrier rate of the incoming video signal. As previously described, phase detector circuit 501 provides a D.C. level output whose status, for example, 0 or 1, is updated by the 6 ¼Hz sample pulse (waveform N of FIG. 3) derived from the reference frame pulse. As illustrated in FIG. 3, waveform N, the sample pulse is compared with a low level portion of waveform J and corresponds to, for example, a D.C. level output of 0 from phase detector circuit 501. If the four-line signal (waveform J) is shifted, the sample will be made during a high level portion of signal J and the output D.C. level of phase detector circuit 501 will be a 1. The D.C. level shift; i.e., 0 to 1, is suitable for use as a control signal to the VTR control circuits so as to invert the VTR phasing and maintain the four-frame subcarrier lock.

Sample signal N is also illustrated in FIG. 3 as an "alternate sample" in phantom form which illustrates the ability to invert the initial output of the phasing control signal. This is readily accomplished by a reference phase select signal coupled to divider 502 so as to shift the reference from signal divider 502 output to coincide with a high in the J signal output.

In practice, the D.C. level status output of the apparatus of FIG. 1 may be used as follows: in a first example, the edit lines carrying the D.C. level status of the recording VTR is coupled to the one or more source VTR's. In this configuration, the recording VTR, which is in the "splice" mode, will signal the source VTRs as to its phase. If a difference in phasing as represented by the D.C. level status is indicated, the reference subcarrier in the source VTR is inverted so that the phasing will be correct, i.e., at a four-frame rate so as to make a correct electronic splice without unlocking the capstan of either VTR.

In a second example, which does not require coupling the edit lines of the recording machine to the source machine, the capstan of a VTR, which is in the recording mode, can be automatically unlocked by the information contained in the phasing signal so as to slip the capstan to the next lock-up position which will then be the correct phase.

What is claimed is:

1. A PAL frame phasing system for developing a phasing signal synchronized to a system frame reference signal and a PAL composite video signal including at least color burst and horizontal synchronizing components, comprising:
    a color burst detector for developing a color burst switching signal at a two-line period representative of the polarity of burst phasing with respect to said horizontal component and for developing a four-line rate signal;
    a four-line rate detector coupled to said burst detector and responsive to said color burst switching signal and to said four-line rate signal for developing a four-line rate signal representative of the burst phasing repetition rate;
    first means coupled to said color burst detector and said four-line rate detector and responsive to said color burst switching signal and to said four-line rate signal representative of said burst phasing repetition rate for developing a first signal at a four-line period switching rate to said four-line rate signal representative of said burst phasing repetition rate signal;
    second means responsive to said system frame reference signal for developing a second signal at a four-frame rate; and
    phase detecting means coupled to said first and said second means and responsive to said first and second signals for developing a third signal representative of the phasing status of said first signal with respect to said second signal.

2. A PAL frame phasing system according to claim 1 wherein said four-line rate detector comprises:
    first combining means responsive to coincident output signals from said color burst switching signal and to said four-line rate signal for developing a third output signal at twice said burst repetition rate;
    a source of frame rate reference signals phased to said composite video signal; and
    second combining means responsive to said third output signal and said source of frame rate reference signals for providing said four-line period switching rate signal phased to said four-line rate signal representative of said burst phasing repetition rate signal.

3. A PAL frame phasing system according to claim 2 wherein said first means comprises a divider circuit in which the phase of said four-line period switching signal is set by said burst phasing repetition rate signal.

4. A PAL frame phasing system according to claim 3 wherein said second means comprises a divider circuit in which the phase of said four-frame rate signal is set by a reference phase select signal.

5. A PAL frame phasing system according to claim 4 wherein said phase detecting means comprises a J-K flip-flop whose signal output status of 0 and 1 is representative of the phasing status of said first signal with respect to said second signal coupled to the clock input of said flip-flop.

* * * * *

UNITED STATES PATENT OFFICE
CERTIFICATE OF CORRECTION

PATENT NO. : 4,052,733

DATED : October 4, 1977

INVENTOR(S) : William Joseph Derenbecher, Jr.

It is certified that error appears in the above-identified patent and that said Letters Patent are hereby corrected as shown below:

Column 1, Line 34 - after "cycle" the word "in" should be -- on -- ;

Column 1, Line 39 - under the heading "Frame" should be -- 1 -- ;

Column 2, Line 39 - "rack" should be -- track -- ;

Column 5, Line 19 - "one" should be -- once -- ;

Column 6, Line 21 - "ANG" should be -- AND -- ; and

Column 8, Line 14 - after "switching rate" add -- phased -- .

Signed and Sealed this

Twentieth Day of June 1978

[SEAL]

Attest:

RUTH C. MASON
Attesting Officer

DONALD W. BANNER
Commissioner of Patents and Trademarks